United States Patent [19]
Vorobeichikov et al.

[11] 4,137,038
[45] Jan. 30, 1979

[54] CLINKER ROASTING PLANT

[75] Inventors: Leonid T. Vorobeichikov; Vitaly G. Golovnya, both of Kharkov, U.S.S.R.

[73] Assignee: Gosudarstvenny Vsesojuzny Institut po Proektirovaniju i Nauchno-Issledovatelskim rabotam "JUZHGIPROTSEMENT", U.S.S.R.

[21] Appl. No.: 804,267

[22] Filed: Jun. 7, 1977

[30] Foreign Application Priority Data
Nov. 18, 1976 [DE] Fed. Rep. of Germany ....... 2418207

[51] Int. Cl.² .............................................. F27D 15/02
[52] U.S. Cl. ........................................ 432/77; 432/83; 432/116
[58] Field of Search .................... 432/77, 78, 80, 83, 432/84, 85, 106, 116, 249; 34/20; 106/100

[56] References Cited
U.S. PATENT DOCUMENTS

| | | | |
|---|---|---|---|
| 3,672,069 | 6/1972 | Reh et al. | 34/20 |
| 3,822,651 | 7/1974 | Harris et al. | 432/116 |
| 3,866,673 | 2/1975 | Pavlov et al. | 432/83 |
| 3,957,111 | 5/1976 | Kobayashi et al. | 432/77 |
| 3,976,422 | 8/1976 | Motyczynski et al. | 432/78 |
| 4,035,142 | 7/1977 | Hatzenbichler et al. | 432/245 |

Primary Examiner—Henry C. Yuen
Attorney, Agent, or Firm—Robert E. Burns; Emmanuel J. Lobato; Bruce L. Adams

[57] ABSTRACT

A clinker roasting plant comprising a rotary kiln having a housing and a hot head. A cooler for cooling clinker is mounted downstream of the rotary kiln. There are also provided heat-exchange tubes arranged in the zone of flow of roasted clinker from the hot end of the kiln to the place of discharge of finished clinker from the cooler. A heat insulating casing is provided around the heat-exchange tubes, the casing having at least one movable wall for connecting the inner space of the heat insulating casing with the inner space of the zone of flow of clinker.

11 Claims, 7 Drawing Figures

CLINKER ROASTING PLANT

BACKGROUND OF THE INVENTION

The invention relates to the cement manufacture and more specifically to clinker roasting plants.

The invention may be most advantageously used in the production of cement clinker in rotary kilns and it may also find application in chemical industry and ferrous and non-ferrous metal production where rotary kilns are employed.

A clinker roasting plant generally comprises a rotary kiln in which clinker is roasted and a hot head through which clinker is discharged from the rotary kiln.

Clinker is fed from the hot head to a cooler for cooling wherefrom the clinker is discharged as finished product.

Clinker is roasted in a rotary kiln by using burning fuel, such as fuel oil, gas and the like which is fed along a pipeline through the hot head of the kiln to the inner space of the rotary kiln housing.

Roasted clinker radiates much heat upon leaving the rotary kiln and during cooling in the cooler. This heat is used to heat the air cooling the clinker which is then directed to the kiln for fuel combustion. Thus, a major part of the heat emitted by hot clinker is utilized, but a substantial part of this heat is lost upon outburst of air from the cooler for cooling the clinker and during transportation of clinker.

Known in the art is a clinker roasting plant in which the heat radiated by clinker in the hot head of the kiln is utilized for heating fuel oil used as fuel for the kiln.

Preheating of fuel oil prior to burning is required for better combustion because the atomization of fuel is thus improved.

For that purpose, there is provided a heat exchanger in the form of a tubular coil surrounding a burner used for burning fuel oil. Fuel oil is positively fed to the coil to be heated up to a pre-set temperature and then fed to the burner.

This construction of the heat exchanger is explosion and fire hazardous due to direct contact of the coil with hot air-gas medium and to heat radiated by incandescent clinker. The coil-shaped heat exchanger does not provide for increase in the heat-exchange surface so that it is unsuitable for heating great quantity of water fed to the heat exchanger. It should be noted that assembly, disassembly, cleaning and other operations with the heat exchanger are also complicated because they can only be performed after suspension of kiln operation and its cooling.

Known in the art is a clinker roasting plant in which heat-exchange tubes are mounted to the inner side of the rotary kiln lining, and water circulates in the tubes. During operation of the kiln, a protective layer is formed which coats the inner side of the kiln walls and the tubes mounted thereto. This protective layer constitutes a protective coating preventing the heat-exchange tubes from wearing out.

This arrangement of the heat-exchange tubes permits, however, the water circulating therein to be heated at only 40° C. This arrangement is almost unsuitable for utilization of heat of waste water because the tubes are rotated together with the kiln so that it is impossible to sealingly feed the flows of outcoming water to an external heat supply piping system which operates at relatively high pressure of up to 12 atm. In case of breakage of the protective coating at some portions of the tubes the bare tubes may burn through, and feeding of great quantity of water to the kiln in such case may result in a blow-up.

It is also known to use heat-exchange tubes which are accommodated in the inner space of a clinker cooler, e.g. secured to the side walls. The tubes may be of any configuration, such as in the form of a coil. A coolant is fed to the tubes for taking off the heat and for cooling the clinker. Water is generally used as coolant.

The tubes are arranged in difficulty accessible places in the inner space of the clinker cooler so that their inspection and repair are complicated. In addition, they are prone to an intensive wear and dust deposit so that their heat-exchange capacity is impaired.

Inspection, assembly, disassembly and repair of the tubes cannot be made without suspending operation of the kiln and clinker cooler.

A short-time interruption of water circulation in the tubes may result in burning through of the heat-exchange tubes.

A common disadvantage of the prior art plants resides in the fact that in cases hot water is not required, such as during summer period when water is not fed to heat exchangers, the heat-exchange tubes are burnt through and become unsuitable for operation.

SUMMARY OF THE INVENTION

It is an object of the invention to eliminate the disadvantages of prior art clinker roasting plants.

It is also an object of the invention to eliminate the possibility of burning through of heat-exchange tubes and to avoid the danger of blow-up of the clinker roasting plant.

Another object of the invention is to provide an opportunity of assembly and disassembly and repair operations with heat-exchange tubes without suspending operation of the kiln and clinker cooler.

Still another object of the invention is to provide for controlling the removal of heat from hot clinker.

It is also an object of the invention to provide for complete removal of coolant from heat exchangers during operation of the kiln.

Still another object of the invention is to improve the intensity of heat removal from hot clinker.

Yet another object of the invention is to provide for reliable, safe and intensive removal of heat radiated by hot roasted clinker.

The above objects are accomplished by that in a clinker roasting plant comprising a rotary kiln having a housing connected to a hot head, a cooler for cooling clinker mounted downstream the hot head and heat-exchange tubes arranged along a zone of flow of roasted clinker from the hot end of the kiln housing to the place of discharge of finished clinker from the cooler, according to the invention, the heat-exchange tubes are accommodated in a heat insulating casing having at least one movable wall for connecting the inner space of the heat insulating casing to the inner space of the zone of flow of the clinker.

The accommodation of the heat-exchange tubes in the heat-insulating casing having a movable wall enables the insulation of the heat-exchange tubes from the action of heat radiated by the clinker during the periods when it is not required to remove the heat. This contributes to the preservation of the heat-exchange tubes and guarantees their safe use.

In addition, the assembly, disassembly and repair operations may be performed without stopping the kiln which is important for continuous operation of the clinker roasting plant.

Filling of the tubes with liquid coolant is considerably simplified and there is provided an opportunity of complete emptying of the tubes without stopping the clinker roasting plant.

The heat-exchange tubes in the clinker roasting plant according to the invention are preferably mounted to the outer surface of the housing of the hot head of the kiln, and the inner space of the heat insulating casing communicates with the inner space of the hot head of the kiln by means of a common movable wall.

This construction enables utilization of excessive heat of hot clinker before it is admitted to the cooler for cooling and reduction of heat losses upon outburst of air fed for cooling hot clinker.

In the clinker roasting plant, the heat-exchange tubes are preferably mounted to the outer surface of the cooler housing for cooling clinker, and the inner space of the heat insulating casing communicates with the inner space of the cooler for cooling clinker by means of a common movable wall.

This construction enables utilization of excessive heat of hot clinker admitted to the cooler for cooling, and the heat losses upon outburst of air fed for cooling hot clinker are also reduced.

In the clinker roasting plant, the heat-exchange tubes are preferably mounted to the outer surface of the housing of the hot head for the kiln and of the cooler for cooling clinker, and the inner spaces of the heat insulating casings communicate with the inner spaces of the hot head of the kiln and of the cooler for cooling clinker by means of common movable walls.

This construction enables utilization of heat of hot clinker both before it is admitted to the cooler and within the cooler for cooling clinker.

The heat-exchange tubes may be mounted to the inner surface of the housing of the hot head of the kiln. This arrangement of the heat-exchange tubes permits the invention to be used in the plants having recovery-type coolers.

Reflectors are preferably mounted to the inner surface of the housing of the hot head of the kiln of the clinker roasting plant so as to reflect radiant heat of the clinker to the surface of the heat-exchange tubes.

This construction enables intensification of heat removal due to reflection of radiant energy of the clinker directly to the surface of the heat-exchange tubes.

Side walls of the hot head of the kiln in the clinker roasting plant supporting the heat-exchange tubes may be arranged to extend at an angle greater than 90° relative to the front wall of the hot head of the kiln.

This construction enables intensification of removal of heat emitted by the clinker to the surface of the heat-exchange tubes.

The inner space of the heat insulating casing in the clinker roasting plant preferably communicates with the external environment for either natural or forced circulation of air.

This enables the cooling of the heat-exchange tubes and control of heat removal over wider range.

The heat insulating casing in the clinker roasting plant may be made in the form of a part of the housing of the hot head of the kiln.

This permits the hot head of the kiln and the heat insulating casing to be made as an integral assembly.

The heat insulating casing in the clinker roasting plant may be made in the form of a part of the cooler for cooling clinker.

This permits the housing of the cooler for cooling clinker and the heat insulating casing to be made as an integral assembly.

BRIEF DESCRIPTION OF THE DRAWINGS

The invention will now be described with reference to specific embodiments thereof illustrated in the accompanying drawings, in which.

DESCRIPTION OF THE PREFERRED EMBODIMENTS

Figure 1:
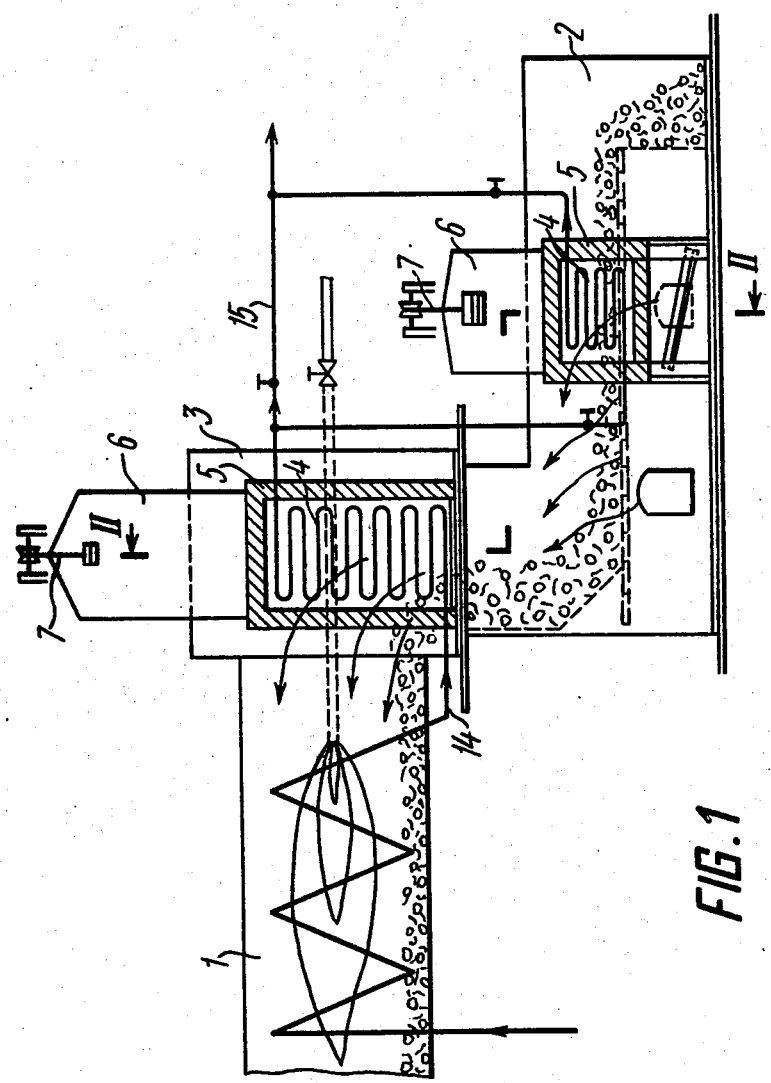
FIG. 1 is a diagrammatic general side view of the clinker roasting plant according to the invention.

The clinker roasting plant is designed for the manufacture of roasted clinker to be used in the cement production.

A clinker roasting plant generally comprises a rotary kiln 1 (FIG. 1) and a cooler 2 for cooling clinker which is mounted along the zone of flow of finished clinker downstream the rotary kiln 1, at the hot end thereof.

The rotary kiln 1 has a cool end at which starting materials are generally loaded for producing clinker, and a hot end for discharging roasted hot clinker. The rotary kiln 1 is coupled to the cooler 2 for cooling clinker by means of a hot head 3.

Hot roasted clinker at above 1200° C. is fed from the hot end of the kiln 1 (FIG. 2) through the hot head 3 and loading shaft to the cooler 2 for cooling clinker. For cooling the clinker, air is fed to the cooler 2, passes through a layer of hot clinker to be heated and to cool the clinker. The air is heated in a direct contact with the hot clinker mainly due to convection and heat conductance. Then a major part of the heated air is fed to the kiln 1 for burning fuel which is fed for roasting clinker.

Since the amount of air required for burning fuel is insufficient for cooling clinker, air is fed in excess to the cooler 2. The excessive quantity of dust laden hot air is exhausted into atmosphere to pollute the environment. Great amount of heat is also lost.

In order to eliminate the disadvantages of prior art plants for roasting clinker, according to the invention, the clinker roasting plant is provided with heat-exchange tubes 4 (FIGS. 1, 2) accommodated in a heat insulating casing 5. The heat insulating casing 5 has at least one movable wall 6 for connecting the inner space of the heat insulating casing 5 with the inner space of a zone being cooled.

The heat-exchange tubes 4 are arranged along a path of flow of roasted clinker from the hot end of the kiln 1 to the place of discharge of finished clinker from the cooler 2. The heat-exchange tubes 4 may be of any configuration, they may be arranged in several rows and may have an enlarged surface due to the use of additional members. The heat-exchange tubes may also have any appropriate shape in the cross-section. Maximum heat absorbing surface should preferably be provided. It should be born in mind that the heat-exchange tubes 4 mainly absorb radiant heat emitted by hot clinker.

The heat-exchange tubes 4 (FIGS. 2, 3) may be mounted to the outer surface of the housing of the hot head 3 of the kiln 1. Thus, the inner surface of the heat insulating casing 5 communicates with the inner space of the hot head 3 of the kiln 1 by means of a common movable wall 6 which comprises a lined metal slab. The wall 6 can be moved either manually or automatically by means of a hoisting mechanism 7, such as a rope and pulley system.

Figure 3:
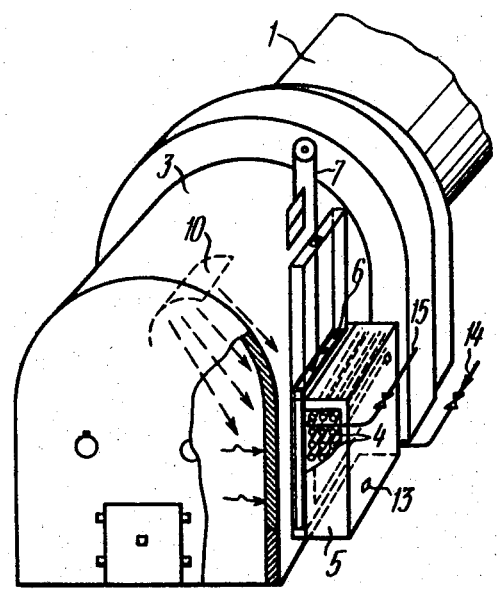
FIG. 3 is a view taken on the side of the hot end of the kiln showing the arrangement of the heat-exchange tubes on the outer surface of the hot head of the kiln.
Figure 4:
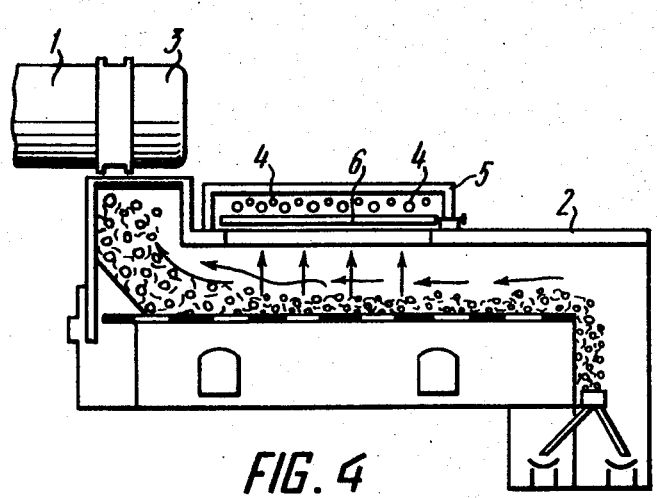
FIG. 4 is a side elevation view showing the arrangement of the heat-exchange tubes on the outer surface of the cooler for cooling clinker.

The heat-exchange tubes 4 (FIGS. 4, 3) may be mounted to the outer surface of the housing of the cooler 2 for cooling clinker. The inner space of the heat insulating casing 5 communicates with the inner space of the cooler 2 by means of the common movable wall 6. The wall 6 can be moved either manually or automatically by means of the hoisting mechanism 7.

Figure 2:
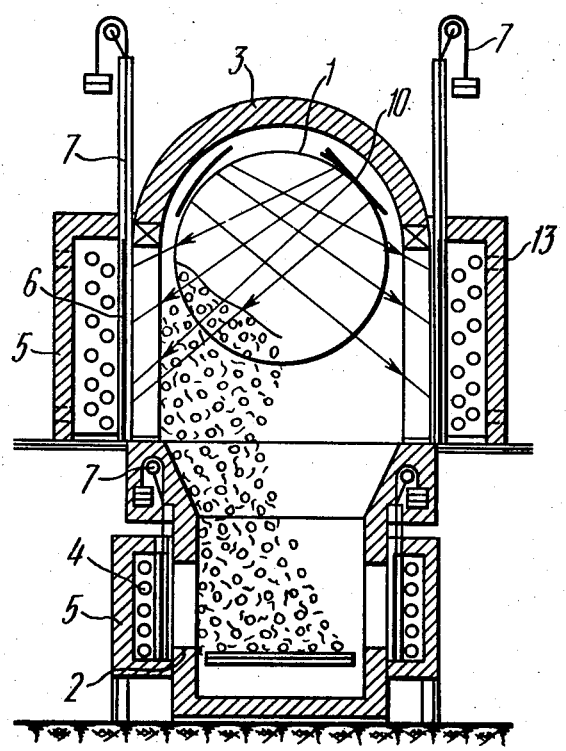
FIG. 2 is an enlarged sectional view taken along the line II—II in FIG. 1.

FIGS. 1, 2 show an embodiment of the arrangement of the heat-exchange tubes 4 on the outer surface of the housing of the hot head 3 of the kiln 1 and cooler 2 for cooling clinker. The inner spaces of the heat insulating casings 5 communicate with the inner spaces of the hot head 3 of the kiln 1 and cooler 2 for cooling clinker, respectively, by means of the common movable walls 6.

Figure 5:
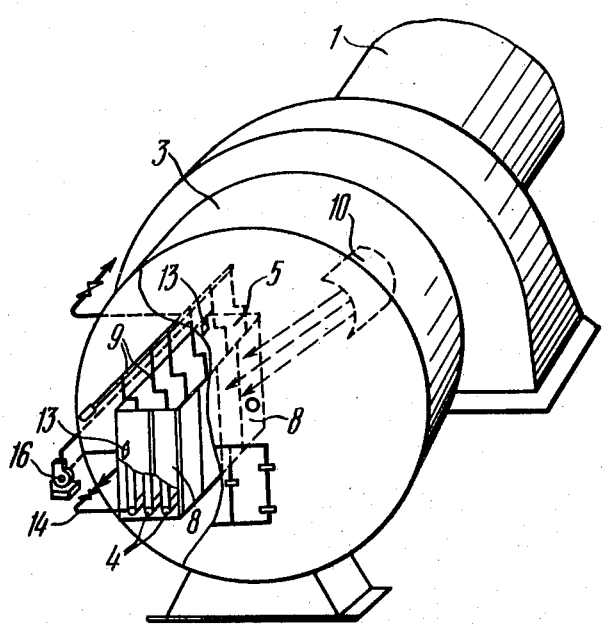
FIG. 5 shows the arrangement of the heat-exchange tubes on the inner surface of the hot head of the kiln with the use of recovery-type cooler.

This arrangement of the heat-exchange tubes 4 ensures the best performance of the clinker roasting plant and enables utilization of the heat of hot clinker both before it is admitted to the cooler 2 and within the cooler 2 for cooling clinker.

Where the rotary kilns 1 (FIG. 5) are provided with recovery-type coolers, the heat-exchange tubes 4 are mounted to the inner surface of the housing of the hot head 3 of the kiln 1. In this case, the inner space of the heat insulating casing 5 communicates with the inner space of the hot head 3 of the kiln 1 by means of a wall 8 of the heat insulating casing 5 which is movable relative to the heat insulating casing 5 and is connected to a linkage 9.

Reflectors 10 (FIGS. 2, 3, 5) are preferably provided on the inner surface of the hot head 3. The reflectors 10 comprise flat or concave refractory reflecting members with a mirror finish surface which are arranged in such a manner that radiant heat emitted by the clinker gets to their mirror finish surface and then is reflected therefrom to the heat-exchange tubes 4.

Figure 6:
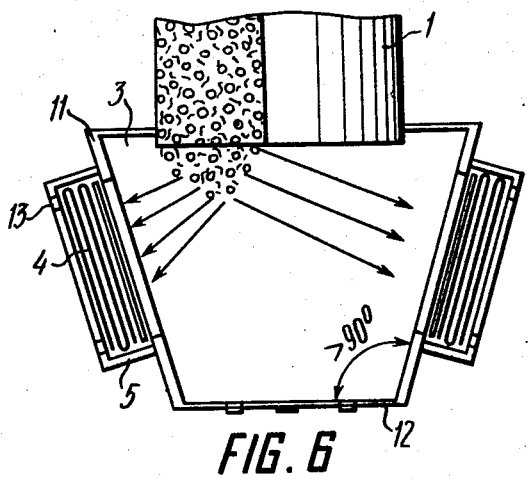
FIG. 6 shows an embodiment of the hot head of the kiln.

Side walls 11 (FIG. 6) of the hot head 3 of the kiln 1 supporting the heat-exchange tubes 4 may be arranged to extend at angle greater than 90° relative to a front wall 12 of the hot head 3 of the kiln 1.

This construction enables an intensification of removal of heat radiated by clinker to the surface of the heat-exchange tubes.

The heat insulating casing 5 is provided with passages 13 (FIGS. 2, 5, 6) for natural or forced circulation of air.

Figure 7:
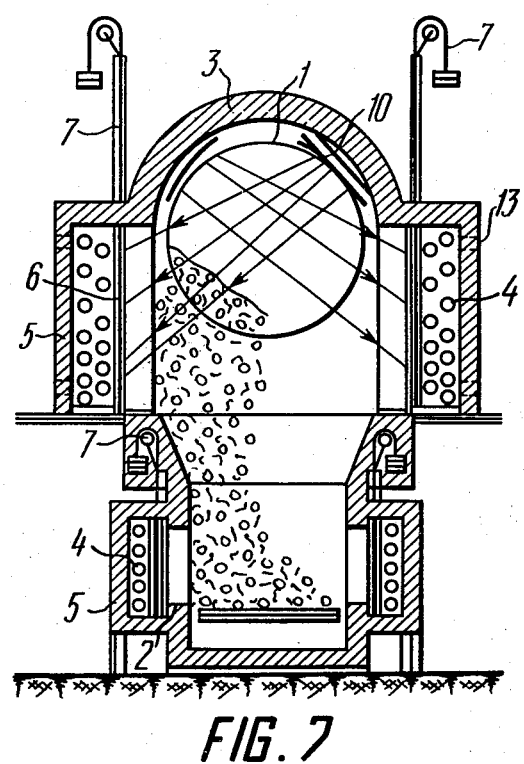
FIG. 7 shows an embodiment of the heat insulating casing.

In a practical embodiment of a clinker roasting plant, the heat insulating casing 5 (FIG. 7) may be made as a part of the housing of the hot head 3 of the kiln 1. The heat insulating casing 5 may also be made as a part of the housing of the cooler 2 for cooling clinker.

The clinker roasting plant functions in the following manner.

The heat-exchange tubes 4 are filled with water via supplty pipelines 14 (FIG. 1, 3), and then a forced circulation of this water is effected. Subsequently the movable wall 6 of the hot head 3 and the cooler 2 is opened. Heat rays emitted by the clinker and reflectors 10 get to the heat-exchange tubes 4 to heat the water circulating therein, and this water is fed to a user through delivery pipelines 15. The amount of removed heat and respectively the temperature of delivered water are controlled by the degree of opening of the movable walls 6.

Incandescent clinker at above 1200° C. leaving the head of the kiln 1 intensively radiates heat to the top and side surfaces of the hot head 3 of the kiln 1 and cooler 2 thus resulting in their wear. The radiant heat has no substantial effect on heating of the air fed for fuel combustion due to its transparency.

Therefore, the radiant heat of hot clinker mainly acts on the surface of the heat-exchange tubes 4 and ensures the intensive heating of the coolant, that is water circulating therein. Air heated in the cooler 2 to be fed for fuel combustion does not substantially give up heat to the heat-exchange tubes 4 due to a low velocity of this air in the heat insulating casing 5 so that the air temperature is not lowered.

Therefore, the clinker roasting plant according to the invention enables utilization of excessive heat radiated by hot clinker without lowering the temperature of heated air fed for fuel combustion.

Thus, the service life of the housing of the hot head 3 of the kiln 1 and the cooler 2 for cooling clinker is prolonged, and heat and dust losses from the cooler 2 are reduced.

In case of repair, interruption of the kiln operation or emergency conditions, the movable walls 6 completely insulate the heat exchange tubes 4 from the incidence of heat flux from the hot head of the kiln. Natural or forced circulation of air by means of a blower 16 (FIG. 5) is effected in the intertube space through the passages 13.

Pre-set programming of opening and closure of the movable walls 6 (FIGS. 1, 2) of the heat insulating casing 5 and washing of the heat-exchange tubes 4 with air provide thermal conditions ensuring reliable and safe operation of the heat-exchange system in combination with the rotary kiln 1 and the cooler 2.

The clinker roasting plant with the heat-exchange system according to the invention is preferably employed in combination with an apparatus for utilization of heat radiated by the housing of the rotary kiln.

Hot water from the apparatus for utilization of heat radiated by the housing of the rotary kiln is fed at 80–90° C. through the pipelines 14 to the heat-exchange tubes 4 in which the water is afterheated to above 110° C. within pre-set limits.

Other liquids, such as fuel oil may be heated in the heat-exchange tubes 4.

The arrangement of the heat-exchange tubes 5 according to the invention enables efficient utilization of heat in the hot head 3 of the rotary kiln 1 and in the cooler 2 for cooling clinker which was not so far possible in practice.

What is claimed is:

1. A clinker roasting plant comprising: a rotary kiln having a housing and a hot head; a cooler for cooling clinker mounted downstream of said rotary kiln; heat-exchange tubes arranged in a zone of flow of roasted clinker from a hot end of said kiln housing to a place of discharge of finished clinker from said cooler; a heat insulating casing surrounding said heat-exchange tubes and having at least one movable wall for selectively communicating an inner space of said heat insulating casing with an inner space of said zone of flow of clinker.

2. A clinker roasting plant according to claim 1, wherein the heat-exchange tubes are arranged on an outer surface of said hot head, and the inner space of said heat insulating casing communicates with an inner space of said hot head of the kiln when said movable wall is moved to allow communication.

3. A clinker roasting plant according to claim 2, wherein said heat insulating casing is made as a part of the housing of said hot head.

4. A clinker roasting plant according to claim 1, wherein said heat-exchange tubes are arranged on an outer surface of the housing of said cooler for cooling clinker, and the inner space of said heat insulating casing communicates with an inner space of said cooler for cooling clinker when said movable wall is moved to allow communication therebetween.

5. A clinker roasting plant according to claim 4, wherein said heat insulating casing is made as a part of the housing of said cooler for cooling clinker.

6. A clinker roasting plant according to claim 1, wherein said heat-exchanger tubes are arranged on an outer surface of said hot head and said cooler for cooling clinker, and including an additional movable wall and the inner spaces of said heat insulating casing communicative with inner spaces of said hot head of the kiln and said cooler for cooling clinker when said movable walls are moved to allow communication.

7. A clinker roasting plant according to claim 6, wherein the inner space of said heat insulating casing communicates with the atmosphere for air circulation.

8. A clinker roasting plant according to claim 1, wherein said heat-exchange tubes are arranged to an inner surface of the housing of said hot head.

9. A clinker roasting plant according to claim 1, including reflectors mounted to an inner surface of the housing of said hot head of the kiln to reflect radiant heat of clinker to the surface of said heat-exchange tubes.

10. A clinker roasting plant according to claim 1, wherein side walls of the housing of said hot head supporting said heat-exchange tubes are arranged to extend at an angle greater than 90° relative to a front wall of the housing of said hot head to absorb radiant heat of clinker to the maximum extent.

11. A clinker roasting plant according to claim 1, wherein the inner space of said heat insulating casing communicates with the atmosphere for air circulation.

* * * * *